(12) United States Patent
Wang et al.

(10) Patent No.: US 10,438,136 B2
(45) Date of Patent: Oct. 8, 2019

(54) SYSTEM AND METHOD FOR CARE SUPPORT AT HOME

(71) Applicant: MIDEA GROUP CO., LTD., Foshan, Guangdong Province (CN)

(72) Inventors: Dongyan Wang, San Jose, CA (US); Haisong Gu, Cupertino, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 251 days.

(21) Appl. No.: 15/619,166

(22) Filed: Jun. 9, 2017

(65) Prior Publication Data

US 2018/0357760 A1 Dec. 13, 2018

(51) Int. Cl.
| | |
|---|---|
| *G06K 9/00* | (2006.01) |
| *G06N 20/00* | (2019.01) |
| *G06N 7/00* | (2006.01) |
| *G06K 9/62* | (2006.01) |

(52) U.S. Cl.
CPC ......... *G06N 20/00* (2019.01); *G06K 9/00348* (2013.01); *G06K 9/6262* (2013.01); *G06N 7/005* (2013.01)

(58) Field of Classification Search
None
See application file for complete search history.

(56) References Cited

U.S. PATENT DOCUMENTS

| | | | |
|---|---|---|---|
| 2003/0058111 | A1 | 3/2003 | Lee et al. |
| 2005/0137465 | A1 | 6/2005 | Cuddihy et al. |
| 2006/0001545 | A1 | 1/2006 | Wolf |
| 2009/0137933 | A1 | 5/2009 | Lieberman et al. |
| 2009/0322540 | A1 | 12/2009 | Richardson et al. |
| 2012/0206264 | A1 | 8/2012 | Gannot et al. |
| 2015/0226764 | A1 | 8/2015 | Ten Kate |
| 2016/0287166 | A1* | 10/2016 | Tran ..................... H04B 1/3827 |
| 2017/0095670 | A1* | 4/2017 | Ghaffari .............. A61B 5/0024 |
| 2017/0213145 | A1* | 7/2017 | Pathak .................... G06N 7/005 |
| 2017/0243354 | A1* | 8/2017 | Tafazzoli ................. G06T 7/11 |
| 2018/0333083 | A1* | 11/2018 | Orellano ................ G06F 15/76 |

FOREIGN PATENT DOCUMENTS

| | | |
|---|---|---|
| CA | 103976739 A | 8/2014 |
| CN | 102048521 A | 5/2011 |
| CN | 104510475 A | 4/2015 |
| CN | 2015769205 A | 7/2016 |
| CN | 106539587 A | 3/2017 |
| WO | 2009/070676 A2 | 6/2009 |
| WO | 2014/098765 A1 | 6/2014 |

OTHER PUBLICATIONS

PCT International Search Report and the Written Opinion dated Mar. 8, 2018, issued in related International Application No. PCT/CN2017/103616 (10 pages).

\* cited by examiner

*Primary Examiner* — Atiba O Fitzpatrick
(74) *Attorney, Agent, or Firm* — Morgan, Lewis & Bockius LLP

(57) ABSTRACT

Systems and methods are provided for fall prediction. Such system may comprise one or more sensors configured to obtain at least gait information of a person, and one or more processors coupled to the one or more sensors. The one or more processors may be configured to receive the gait information of the person, obtain gait dynamic features based at least in part on the obtained gait information, and apply the obtained gait dynamic features to a learning model to predict at least a fall movement of the person.

20 Claims, 9 Drawing Sheets

SYSTEM AND METHOD FOR CARE SUPPORT AT HOME

FIELD OF THE INVENTION

This disclosure generally relates to approaches and techniques for abnormal detection at home based on sensing and machine learning.

BACKGROUND

Fall prediction and pre-warning can prevent physical impairments or even deaths caused by fall accidents. In particular, elderly or people with existing conditions are more vulnerable and prone to serious injuries in such accidents. Therefore, it would be desirable to provide systems that can protect people's safety by alerting probable fall accidents.

SUMMARY

Various embodiments of the present disclosure can include systems, methods, and non-transitory computer readable media configured to perform fall prediction. A system for fall prediction may comprise one or more sensors configured to obtain at least gait information of a person, and one or more processors coupled to the one or more sensors. The one or more processors may be configured to receive the gait information of the person, obtain gait dynamic features based at least in part on the obtained gait information, and apply the obtained gait dynamic features to a learning model to predict at least a fall movement of the person.

In some embodiments, to apply the obtained gait dynamic features to the learning model to predict at least the fall movement of the person, the systems, methods, and non-transitory computer readable media may be configured to obtain an environment condition comprising at least one of a temperature or a humidity of an environment of the person, obtain a health condition of the person, and apply the obtained gait dynamic features, the obtained health condition, and the obtained environment condition to the learning model to predict at least the fall movement of the person.

In some embodiments, the one or more sensors may comprise one or more optical sensors, and the optical sensors may comprise at least one of a camera, an infrared sensor, a motion sensor, a temperature sensor, or a gesture sensor.

In some embodiments, the one or more sensors and the one or more processors may be disposed in a household appliance.

In some embodiments, the one or more processors may be coupled to the one or more sensors through a network.

In some embodiments, the gait dynamic features may include at least one of cadence, left step length, right step length, base of support left step, base of support right step, left stride length, or right stride length.

In some embodiments, the learning model may comprise a Dynamic Bayesian Network (DBN) model. To apply the obtained gait dynamic features to the learning model to predict at least the fall movement of the person, the systems, methods, and non-transitory computer readable media may be configured to obtain training data comprising fall movements of various people with associated gait dynamic features, obtain the gait information of the person as incremental data, train the learning model with at least one of the training data or the incremental data to obtain a trained learning model configured to obtain a fall movement probability based on at least one of: one or more gait dynamic features in a current time or one or more gait dynamic features in a previous time, and apply the obtained gait dynamic features to the trained learning model to predict at least the fall movement of the person.

In some embodiments, the prediction of the fall movement may comprise a probability of the fall during a current or future time period.

In some embodiments, the one or more processors may be further configured to control a device to at least mitigate the predicted fall movement. To control the device, the systems, methods, and non-transitory computer readable media may be further configured to cause a change in at least one of a temperature or humidity control setting of an air-conditioner.

In some embodiments, the systems, methods, and non-transitory computer readable media may be further configured to trigger a notification of the prediction.

In some embodiments, a method for fall prediction may comprise obtaining at least gait information of a person, obtaining gait dynamic features based at least in part on the gait information, and applying the obtained gait dynamic features to a learning model to predict at least a fall movement of the person.

In some embodiments, a non-transitory computer-readable medium for fall prediction, may comprise instructions stored therein. The instructions, when executed by one or more processors, may perform the steps of: obtaining at least gait information of a person, obtaining gait dynamic features based at least in part on the gait information, and applying the obtained gait dynamic features to a learning model to predict at least a fall movement of the person.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
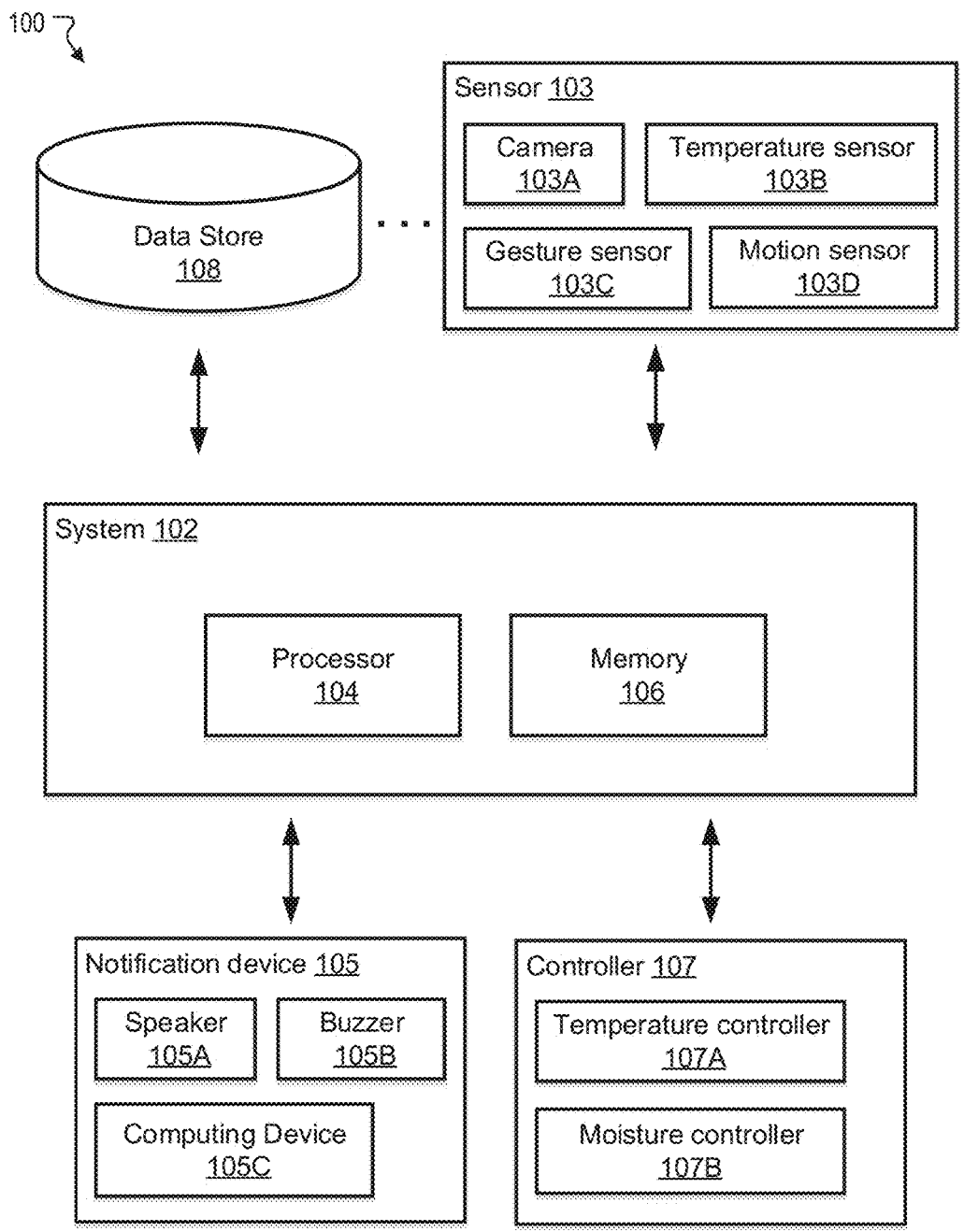
FIG. 1 illustrates an example environment for fall prediction, in accordance with various embodiments.

Falling is one of the leading causes of accidental death and a major cause for personal injuries. Elderly or people with existing conditions are particularly vulnerable to such accidents and are likely to suffer severely. Therefore, it would be desirable to provide systems that can safeguard people's well-being by predicting future fall accidents and alert them to take preventative measures. To effectively prevent fall accidents, the predictions should be at least reasonably accurate. Existing technologies may be able to determine whether a person has fallen at a past or current time, but are inadequate to make accurate predictions in future times.

Various embodiments described below can overcome such problems arising in the realm of fall prevention. Various embodiments of the present disclosure can include systems, methods, and non-transitory computer readable media configured to perform fall prediction. The disclosed systems and methods can be implemented in a variety of environments, e.g., in a household appliance to protect people at home. A system for fall prediction may comprise one or more sensors configured to obtain at least gait information of a person, and one or more processors coupled to the one or more sensors. The one or more processors may be configured to obtain the gait information of the person, obtain gait dynamic features based at least in part on the obtained gait information, and apply the obtained gait dynamic features to a learning model to predict at least a fall movement of the person.

In some embodiments, to apply the obtained gait dynamic features to the learning model to predict at least the fall movement of the person, the systems, methods, and non-transitory computer readable media may be configured to obtain an environment condition comprising at least one of a temperature or a humidity of an environment of the person, obtain a health condition of the person, and apply the obtained gait dynamic features, the obtained health condition, and the obtained environment condition to the learning model to predict at least the fall movement of the person.

In some embodiments, the learning model may comprise a Dynamic Bayesian Network (DBN) model. To apply the obtained gait dynamic features to the learning model to predict at least the fall movement of the person, the systems, methods, and non-transitory computer readable media may be configured to obtain training data comprising fall movements of various people with associated gait dynamic features, obtain the gait information of the person as incremental data, train the learning model with at least one of the training data or the incremental data to obtain a trained learning model configured to obtain a fall movement probability based on at least one of: one or more gait dynamic features in a current time or one or more gait dynamic features in a previous time, and apply the obtained gait dynamic features to the trained learning model to predict at least the fall movement of the person.

Based on the prediction, counter measures can be taken or alerts can be played. In some embodiments, the systems, methods, and non-transitory computer readable media may be configured to control a device to at least mitigate the predicted fall movement. To control the device, the systems, methods, and non-transitory computer readable media may be further configured to cause a change in at least one of a temperature or humidity control setting of an air-conditioner. In some embodiments, the systems, methods, and non-transitory computer readable media may be configured to trigger a notification of the prediction, for example, at a relative's mobile phone.

As such, fall predictions can be effectively achieved, and measures can be taken to mitigate or prevent the accidents. The advantages of the disclosed systems and methods are multifold. The disclosed framework can obtain and fuse existing training data and incremental data to train a learning model for accurate prediction. The training can take place on premise or over cloud. The disclosed systems can be conveniently implemented on home appliances to protect people of various age groups such as elderly and kids who require more than ordinary care, thus forming an automatic home care system. Many existing sensors such as motion sensors and cameras on air-conditioners can be utilized to help achieve the fall prediction, saving costs for hardware installation. Further, the disclosed methods (e.g., the learning model) can accurately predict the fall accidents, because in addition to learning from existing training data, the learning model can self-improve based on incremental or accumulative learning of new data (e.g., data captured from the monitored person's daily life).

FIG. 1 illustrates an example environment 100 for fall prediction, in accordance with various embodiments. The environment 100 presented below is intended to be illustrative. Depending on the implementation, the example environment 100 or components thereof may include additional, fewer, or alternative components or sub-components. As shown in FIG. 1, the example environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein.

The environment 100 may include one or more data stores (e.g., a data store 108) and one or more sensors 103 that are accessible to the system 102. In some embodiments, the data stores may be associated with one or more devices or systems (e.g., a computer, a server, a mobile phone, etc.). The one or more sensors 103 may include a camera 103A, a temperature sensor 103B, a gesture sensor 103C, a motion sensor 103D, a moisture sensor, etc. Some of the sensors may be optical sensors, such as the camera 103A and the motion sensor 103D. The optical sensors may be based on visible light, infra-red light, etc. The sensors may be configured to capture a variety of information and data, such as visible images of people, temperature and moisture levels of an environment, the presence of a person, the gesture of a person, etc.

The environment 100 may further include one or more notification devices 105 and one or more controllers 107 that are accessible to and controllable by the system 102. In some embodiments, the notification device 105 may comprise a speaker 105A, a buzzer 105B, a computing device 105C (e.g., cellphone, tablet, computer, wearable device (smart watch)), etc. The notification device 105 may be configured to notify a detected and/or predicted fall. In some embodiments, the controller 107 may be implemented in a household appliance, such as an air-conditioner, a refrigerator, a vent, a humidifier, a microwave machine, a vacuum cleaner, etc. The controller 107 may comprise a temperature controller 107A and/or a moisture controller 107B configured to tune a temperature and/or a moisture condition of an environment (e.g., a house).

Although the system 102 is shown as a single component in this figure, it is appreciated that the system 102 can be implemented as a single device or multiple devices (e.g., computers, servers, etc.) coupled together. For example, the system 102 may be implemented as a first server and a second server coupled together, and the first server may be configured to interact with the data store 108 and the sensor 103, and the second server may be configured to interact with the notification device 105 and the controller 107.

In some embodiments, one or more of the component described in the environment 100 may be integrated in a single device or system. For example, the system 102 may be integrated with the sensor 103, the notification device 105, and/or the controller 107. An example is described below with reference to FIG. 5. In a specific example, the system 102, the sensor 103, the notification device 105, and the controller 107 may be implemented in a single system or device on the premises of the person to be protected against fall accidents (e.g., a household appliance such as an air-conditioner at the person's home). Alternatively, the system 102, the sensor 103, the notification device 105, and the controller 107 may operate as separate devices. For example, the system 102 may be remotely coupled to the sensor 103 through a network (e.g., a home wireless network, a cloud network, etc.).

The data store 108 may be anywhere accessible to the system 102, for example, in the memory 106, in the controller 107, in another device (e.g., network storage device) coupled to the system 102, or another storage location (e.g., cloud-based storage system, network file system), etc. In general, the system 102, the sensor 103, the notification device 105, and the controller 107 may be able to communicate with one another through one or more wired (e.g., an internal communication bus) or wireless networks (e.g., the Internet) through which data and control signals can be communicated. Various aspects of the environment 100 are described below in reference to FIG. 2 to FIG. 5.

Figure 2:
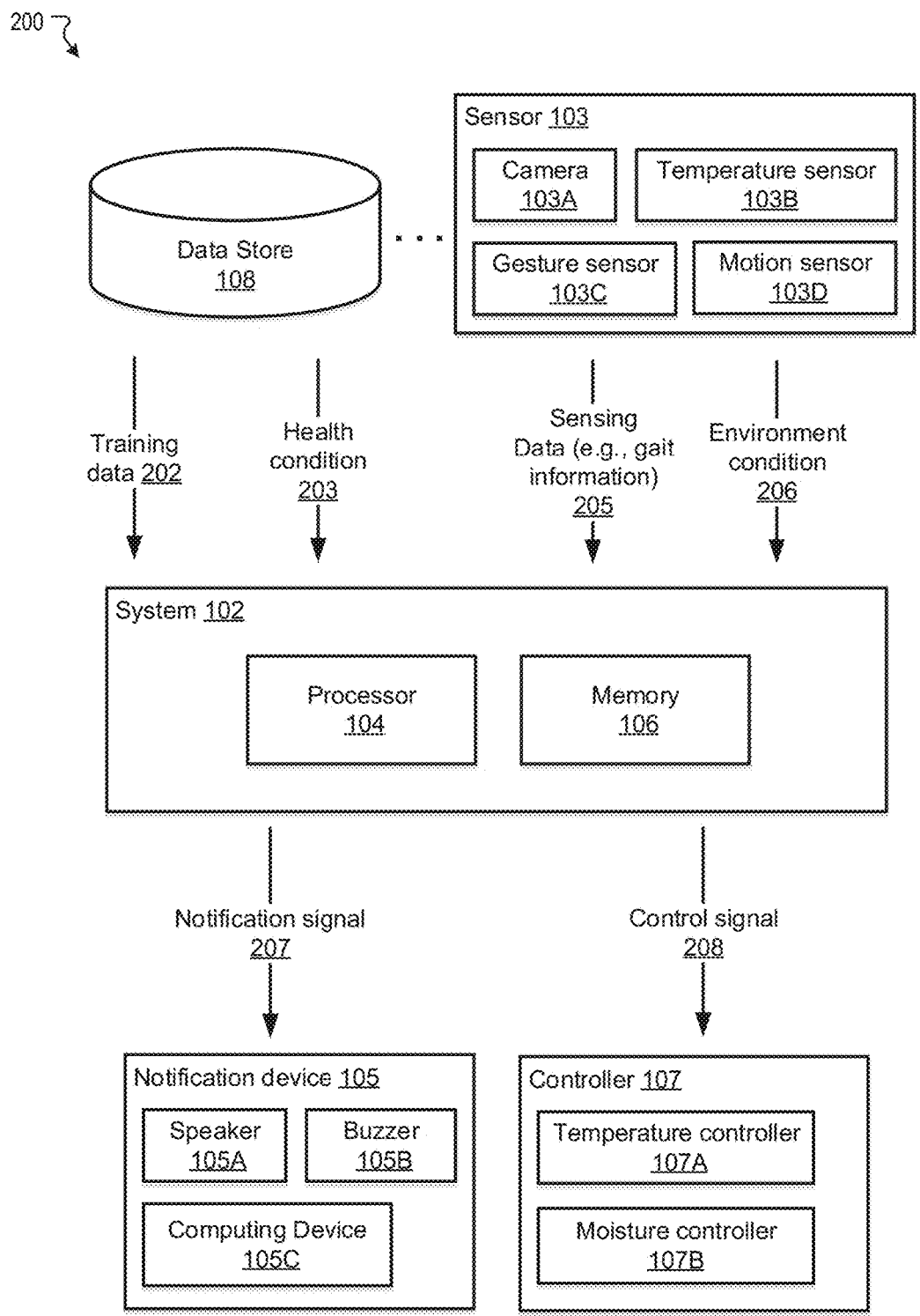
FIG. 2 illustrates an example system for fall prediction, in accordance with various embodiments.

FIG. 2 illustrates an example system 200 for fall prediction, in accordance with various embodiments. The operations shown in FIG. 2 and presented below are intended to be illustrative and may be modified in various ways according to the implementation. The various systems, devices, and components shown in FIG. 2 are similar to those shown in FIG. 1. Though the system 200 can be applied to various environments, the embodiments below may assume an application in a household (e.g., in a home environment), where a person (e.g., an elderly) is monitored for fall prediction.

In various embodiments, the system 102 may obtain training data 202 and a health condition 203 from the data store 108, and obtain sensing data 205 and environment data 206 from the sensor 103. For example, a system for fall prediction may comprise one or more sensors (e.g., the sensor 103) configured to obtain at least gait information of a person, and one or more processors (e.g., the processor 104) coupled to the one or more sensors. The one or more processors may be configured to receive the gait information of the person (e.g., as a part of the sensing data 205), obtain gait dynamic features based at least in part on the obtained gait information, and apply the obtained gait dynamic features to a learning model to predict at least a fall movement of the person. The training data 202 may include data from public databases such as UCF101 (University of Central Florida—Action Recognition Data Set), MNIST (Modified National Institute of Standards and Technology) database, SVHN (Street View House Number) dataset, ImageNet database, etc.

In some embodiments, to apply the obtained gait dynamic features to the learning model to predict at least the fall movement of the person, the system 102 may obtain an environment condition (e.g., the environment condition 206) comprising at least one of a temperature or a humidity of an environment of the person, obtain a health condition of the person (e.g., the health condition 203), and apply the obtained gait dynamic features, the obtained health condition, and the obtained environment condition to the learning model to predict at least the fall movement of the person. More details of training and applying the learning model are described below with reference to FIG. 3A.

Figure 3A:
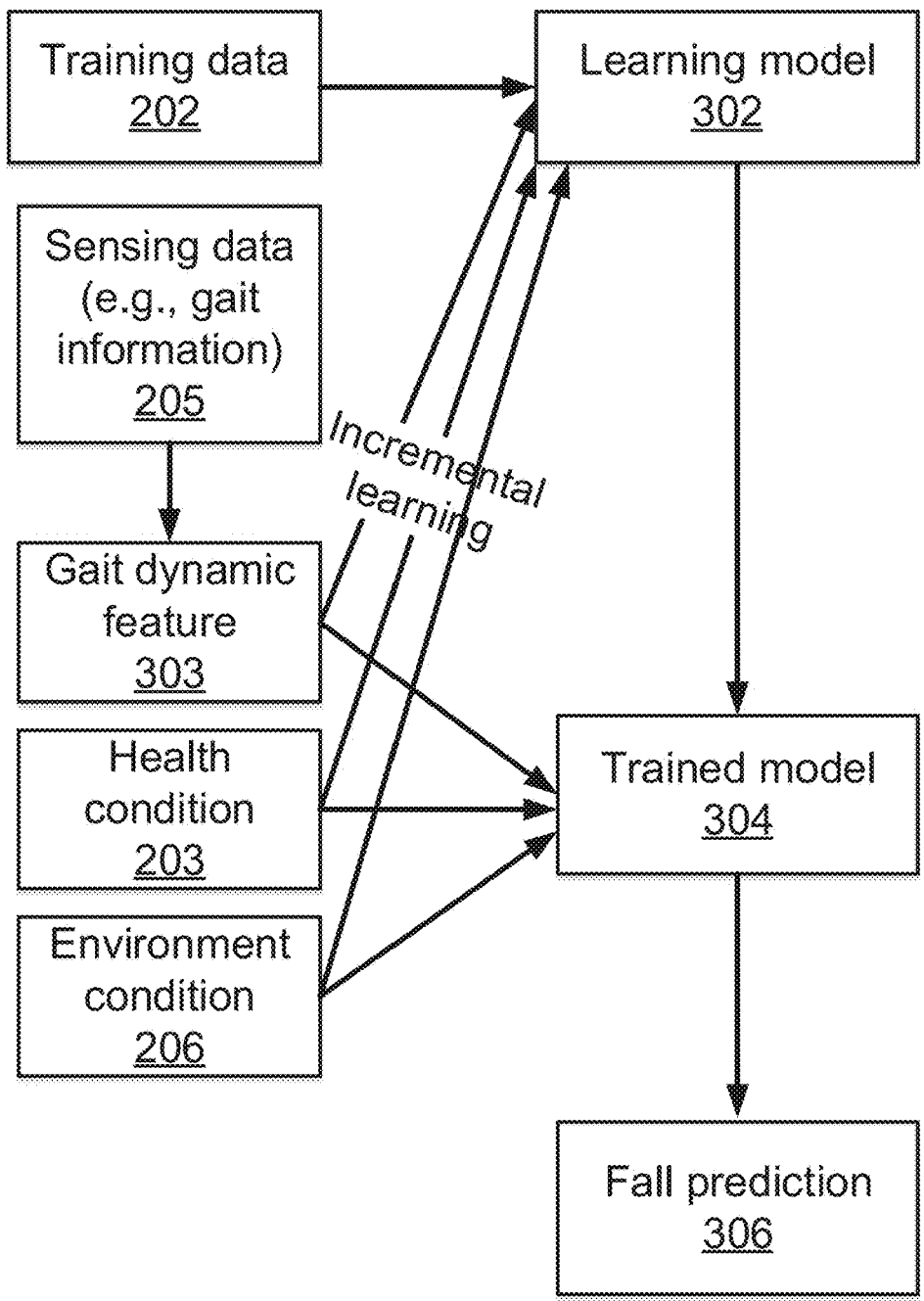
FIG. 3A illustrates a flowchart of an example method for fall prediction, in accordance with various embodiments.

Referring to FIG. 3A, FIG. 3A illustrates a flowchart of an example method 300 for fall prediction, in accordance with various embodiments. The operations shown in FIG. 3A and presented below are intended to be illustrative and may be modified in various ways according to the implementation. The method 300 may be implemented in various environments including, for example, the environment 100 of FIG. 1. The method 300 may be implemented by one or more components of the system 102 (e.g., the processor 104, the memory 106). The operations of the method 300 for fall prediction presented below are intended to be illustrative. Depending on the implementation, the example method may include additional, fewer, or alternative steps performed in various orders or in parallel.

In some embodiments, the method 300 may comprise (1) training a learning model, and (2) applying a trained learning model. There may be many examples of the learning model (e.g., traditional machine learning model, deep generative model, deep neural network model, etc.) for fall prediction. An example Dynamic Bayesian Network (DBN) model is described in more details below with reference to FIG. 3C. The training can be implemented by various platforms, such as TensorFlow, Torch7, Spark, Chainer, DeCAF/Caffe, OverFeat, etc.

In some embodiments, to apply the obtained gait dynamic features to the learning model to predict at least the fall movement of the person, the system 102 may obtain training data (e.g., training data 202) comprising fall movements of various people with associated gait dynamic features and obtain incremental data. The system 102 may compile, fuse, consolidate, or otherwise process the training data and the incremental data for fall prediction. The training data may be publically available or specially generated. The training data may comprise gait information (e.g., movement patterns of body parts such as limbs), health conditions (e.g., pre-existing health conditions, previous diseases), and/or environment conditions (e.g., temperature, humidity) associated with multiple people or their environments.

In some embodiments, to apply the obtained gait dynamic features to the learning model to predict at least the fall movement of the person, the system 102 may also optionally obtain the incremental data. The incremental data may comprise the gait information of the person to be protected against fall accidents (e.g., gait dynamic feature 303 of the person), health condition of the person (e.g., health condition 203), and/or environment conditions of the person (e.g., environment condition 206 such as air-condition operation actions, temperature setting pattern, family face images). The incremental data may be associated with the person being monitored (e.g., directly associated with the person, associated with the person family or relatives, associated with a current living space of the person). The gait dynamic feature 303 may be obtained from sensing data 205 (e.g., captured from home installed video stream) that comprises gait information, and gait dynamic features can be obtained from the gait information as described in more details below with reference to FIG. 3B. With respect to incremental learning, input data (e.g., the gait dynamic feature 303, health condition 203, environment condition 206) may be continuously used to extend the learning model 302's knowledge, that is, to further train the model. Such dynamic training can allow the learning model 302 to adapt to new data without forgetting the existing knowledge (e.g., the training data 202). Applying incremental learning can produce faster and more accurate predictions since the incremental data can continuously improve the model, and some of the incremental data may be directly obtained from the person to be protected from fall accidents.

In some embodiments, the system 102 may train the learning model (e.g., learning model 302) with the training data and/or the incremental data to obtain a trained learning model (e.g., trained model 304). The trained learning model may be configured to obtain a fall movement probability based on: one or more gait dynamic features in a current time and/or one or more gait dynamic features in a previous time. An example trained learning model is described in more details below with reference to FIG. 3C. The system 102 may apply the obtained gait dynamic features to the trained learning model to predict at least a probability of the fall movement of the person (e.g., obtaining fall prediction 306).

Figure 3B:
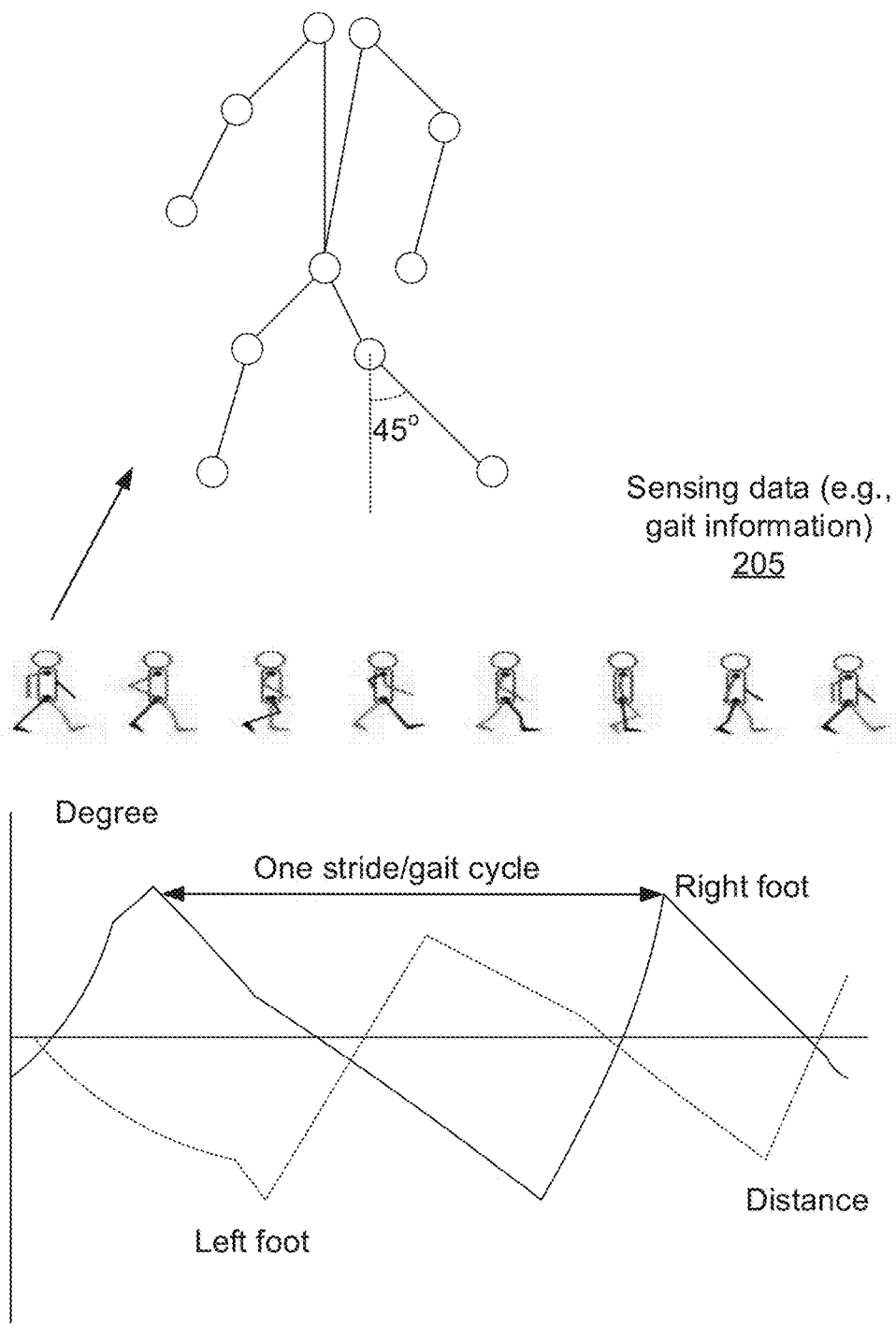
FIG. 3B illustrates an example method for obtaining gait dynamic features, in accordance with various embodiments.

Referring to FIG. 3B, FIG. 3B illustrates an example method 310 for obtaining gait dynamic features, in accordance with various embodiments. The operations shown in FIG. 3B and presented below are intended to be illustrative and may be modified in various ways according to the implementation. The method 310 may be implemented in various environments including, for example, the environment 100 of FIG. 1. The method 310 may be implemented by one or more components of the system 102 (e.g., the processor 104, the memory 106). The operations of the method 310 for fall prediction presented below are intended to be illustrative. Depending on the implementation, the example method may include additional, fewer, or alternative steps performed in various orders or in parallel.

As shown in FIG. 3B, sensing data 205 may comprise a series of frames capturing a movement pattern of a person. Image recognition can be applied to individual frames to identify body parts such as limbs and joints. Thus, the movement patterns of the limbs and joints during walking can be determined as gait dynamic features. For example, the limb and joint positions, angles, and orientations in 3D can be obtained from the frames (e.g., a front leg poised at 45 degrees from a vertical direction), and corresponding gait dynamic features can be obtained. In some embodiments, the gait dynamic features may include cadence, left step length, right step length, base of support left step, base of support right step, left stride length, and/or right stride length. The cadence may refer to a number of step per unit time. The stride length may refer to a distance between two successive placements of the same foot. Each stride length may consist of two step lengths, left and right, each of which may be the distance by which the named foot moves forward in front of the other one. In pathological gait, it is possible for the two step lengths to be different, which can be captured and determined by the disclosed methods to predict a fall. The base of support may refer to the area beneath the person that includes every point of contact that the person makes with the supporting surface (e.g., during a left or right step). These points of contact may be body parts (e.g., feet or hands), or they may include things like crutches or the chair a person is sitting in.

As shown in FIG. 3B, the spatio-temporal gait dynamic features can be analyzed (e.g., graphically). For example, the angle of right and left legs with respect to the vertical direction can be plotted against the walking distance respectively in solid and dash lines. Here, a gait cycle may be the time period, sequence of events, or movements during locomotion in which one foot contacts the ground to when that same foot again contacts the ground. A single gait cycle may be known as a stride. Accordingly, these gait dynamic features can be obtained from frames, extrapolated plots, or other means to train a learning model to make fall predictions.

Figure 3C:
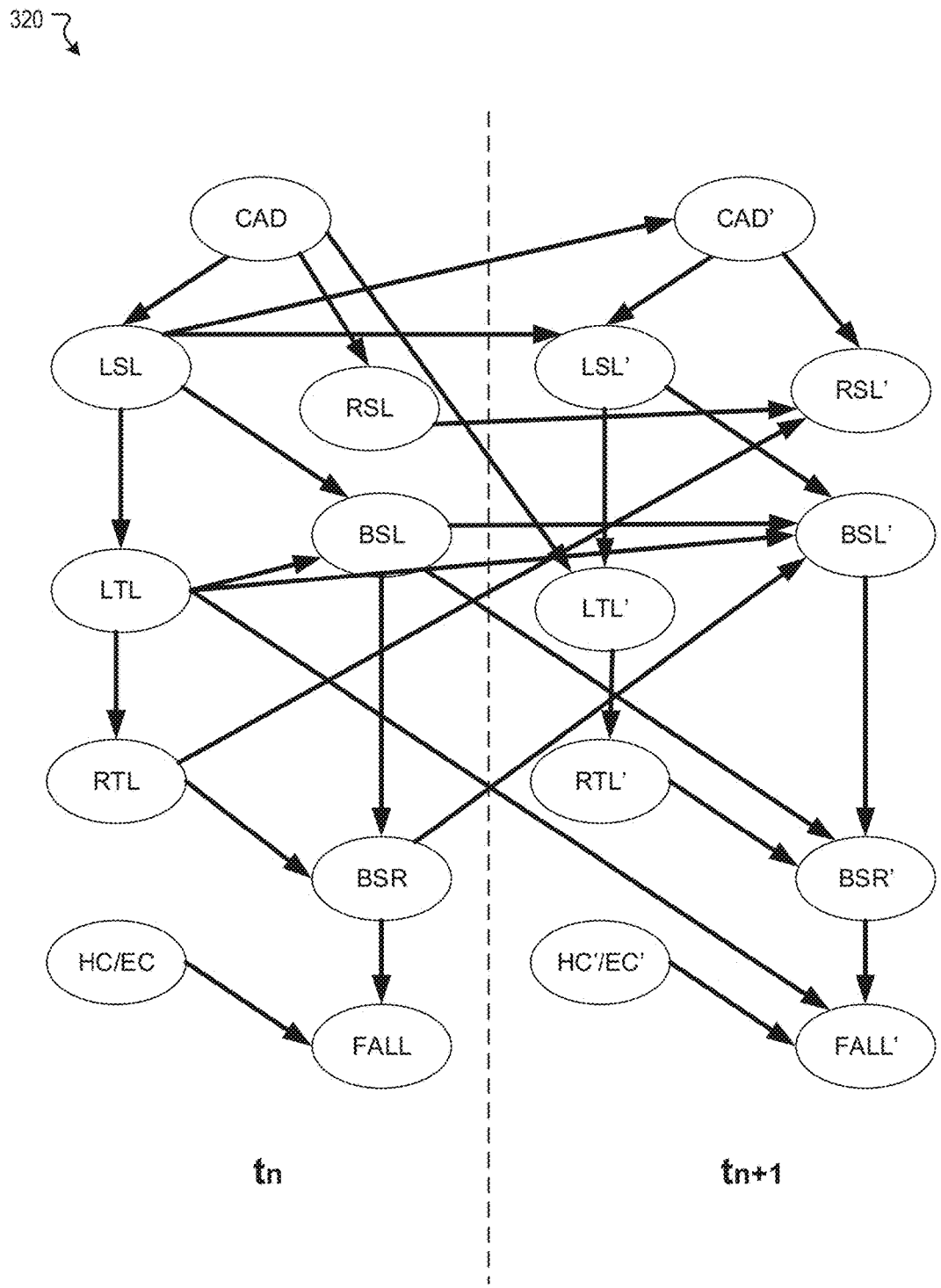
FIG. 3C illustrates an example learning model for fall prediction, in accordance with various embodiments.

Referring to FIG. 3C, FIG. 3C illustrates an example learning model 320 for fall prediction, in accordance with various embodiments. The operations shown in FIG. 3C and presented below are intended to be illustrative and may be modified in various ways according to the implementation. The learning model 320 may be implemented in various environments including, for example, the environment 100 of FIG. 1. The learning model 320 may be implemented by one or more components of the system 102 (e.g., the processor 104, the memory 106). The operations of the learning model 320 for fall prediction presented below are intended to be illustrative. Depending on the implementation, the example model may include additional, fewer, or alternative steps performed in various orders or in parallel.

As discussed above, the DBN model may feed on training data and/or incremental data to model the relationships among the gait variables shown in this figure. In some embodiments, long-term clinical data and the expert knowledge regarding the role of specific gait variables in expressing the risk of falls can be included in the training data. By training, various gait variables (represented by nodes in this figure) and relations (represented by arrows in this figure) can be obtained. The learning model can be further trained by the incremental data of the person's gait features, health condition, and/or environment.

The learning model 320 shown in FIG. 3C may be a DBN model. The DBN model may relate gait variables (e.g., nodes cadence (CAD), left step length (LSL), right step length (RSL), base of support left step (BSL), base of support right step (BSR), left stride length (LTL), right stride length (RTL), health condition (HC), environment condition (EC), probability of fall (FALL)) to each other over adjacent time steps (e.g., steps $t_n$ and $t_{n+1}$). This is also known as a Two-Timeslice BN (2TBN), and at any point in time, the value of a gait variable can be calculated from the internal regressors and the immediate prior value as shown by arrows in FIG. 3C. Each arrow may correspond to a contribution to a pointed factor. In some embodiments, the contribution may have a weight. The nodes can be obtained from common knowledge and/or researches and observations to construct a general DBN architecture with multiple arrows pointing to one another. By training the general DBN with real sample data (e.g., the training data and/or incremental data), the weights in the DBN model can be refined. For example, an important arrow implying causation may increase in its weight value at the refinement, whereas an irrelevant arrow may decrease in its weight value. With the DBN model refined, for each variable pointed to by the arrow(s), the chain rule may be used to compute the probabilities. For example, the probability of falling at $t_n$ P(FALL) given some CAD, LSL, RSL, BSL, LTL, RTL, BSR, HC, and/or EC may be computed as a chain product of the probabilities of the variables (e.g., P(HC and/or EC), P(BSR) given P(RTL) and P(BSL), etc.), until tracing back to P(CAD). Similarly, a gait variable in $t_{n+1}$ can be calculated from one or more gait variables in $t_{n+1}$ and/or $t_n$. For another example, the probability of falling at $t_{n+1}$ P(FALL') can be a chain product of all gait variables pointing to it and variables pointing to the pointing variables. In this example shown in FIG. 3C, all variables except HC/EC and FALL may directly or indirectly contribute to P(FALL'). Thus, if gait variables in $t_n$ are known, P(FALL') can be predicted based on the gait variables in $t_n$ and $t_{n+1}$. Further, the 2TBN can be copied and extended to any future time $t_{n+2}$, $t_{n+3}$, etc. Accordingly, the prediction of the fall movement may comprise a probability of the fall during a current or future time period (e.g., immediately, in 3 weeks, in 6 weeks, in 3 months, in 6 months, etc.).

Referring back to FIG. 2, In various embodiments, the system 102 may be further configured to trigger a notification of a detected or predicted fall movement, and/or control a device to at least mitigate the detected or predicted fall movement. To trigger the notification, the system 102 transmit a notification signal 207 to a notification device 105 (e.g., a speaker 105A, a buzzer 105B, a computing device 105C). For example, the speaker, buzzer, or computing device may play an alert message (e.g., an alarm, a recorded voice, a text) to warn against the fall. The person predicted to fall and/or other people accessible to the notification device (e.g., the person's relative accessing a mobile phone) may be alerted to take proper measures to prevent the accident.

To control the device, the system 102 may transmit a control signal 208 to a controller 107 (e.g., a temperature controller 107A, a moisture controller 107B) to effectuate the control. For example, the control signal 208 may cause the controller 107 to effect a change in at least one of a temperature or humidity control setting of an air-conditioner. A temperature raise in winter may help with blood circulation and agility to lower the chance of fall. A moisture level drop may keep the floor less slippery and lower the chance of fall.

Figure 4A:
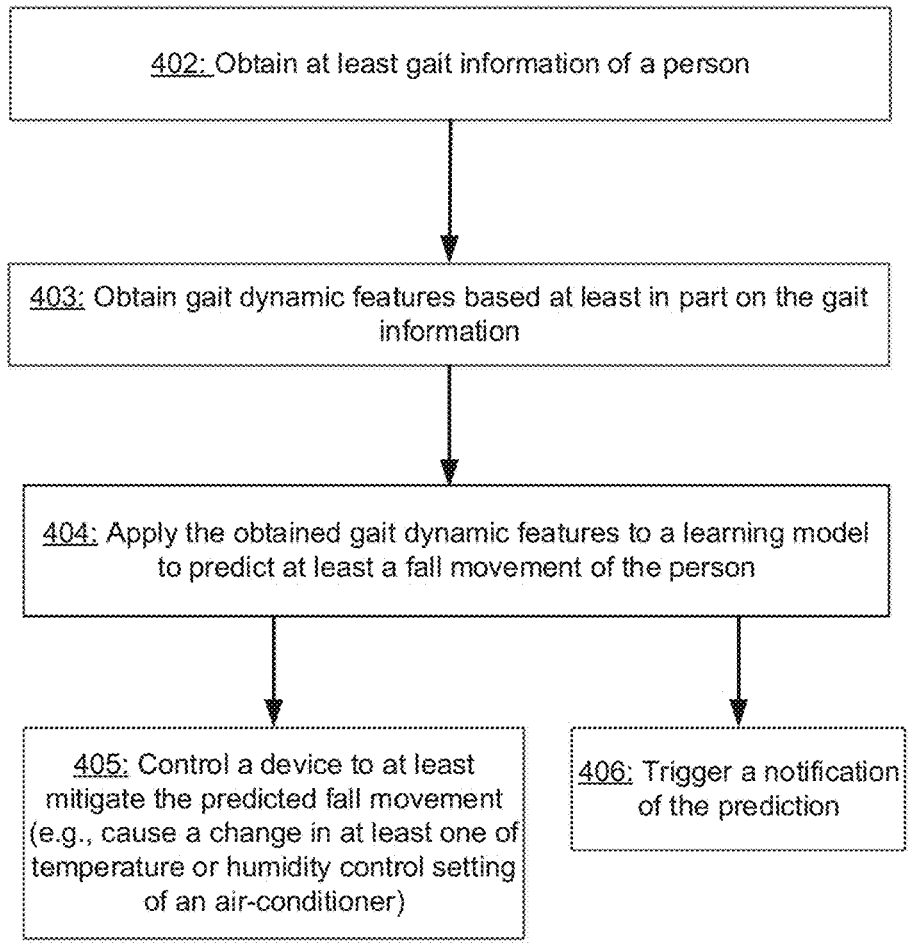
FIGS. 4A-4C illustrate flowcharts of an example method for fall prediction, in accordance with various embodiments.
Figure 4B:
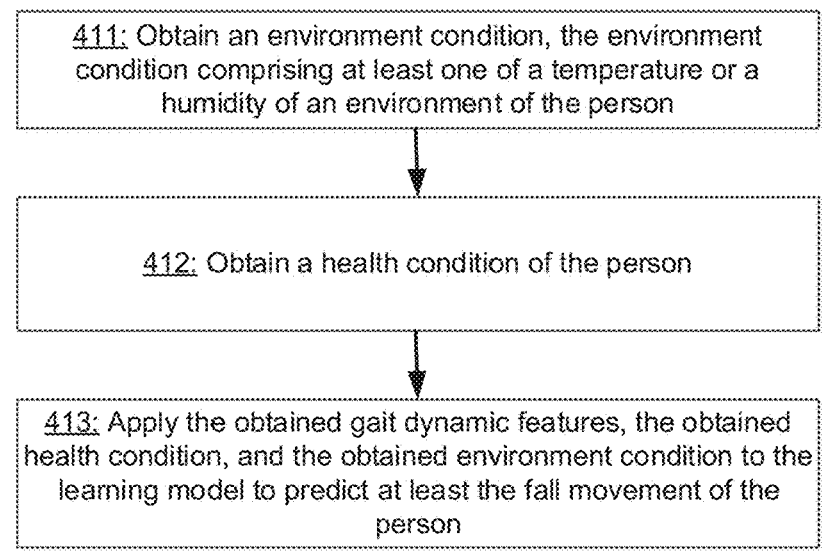
Figure 4C:
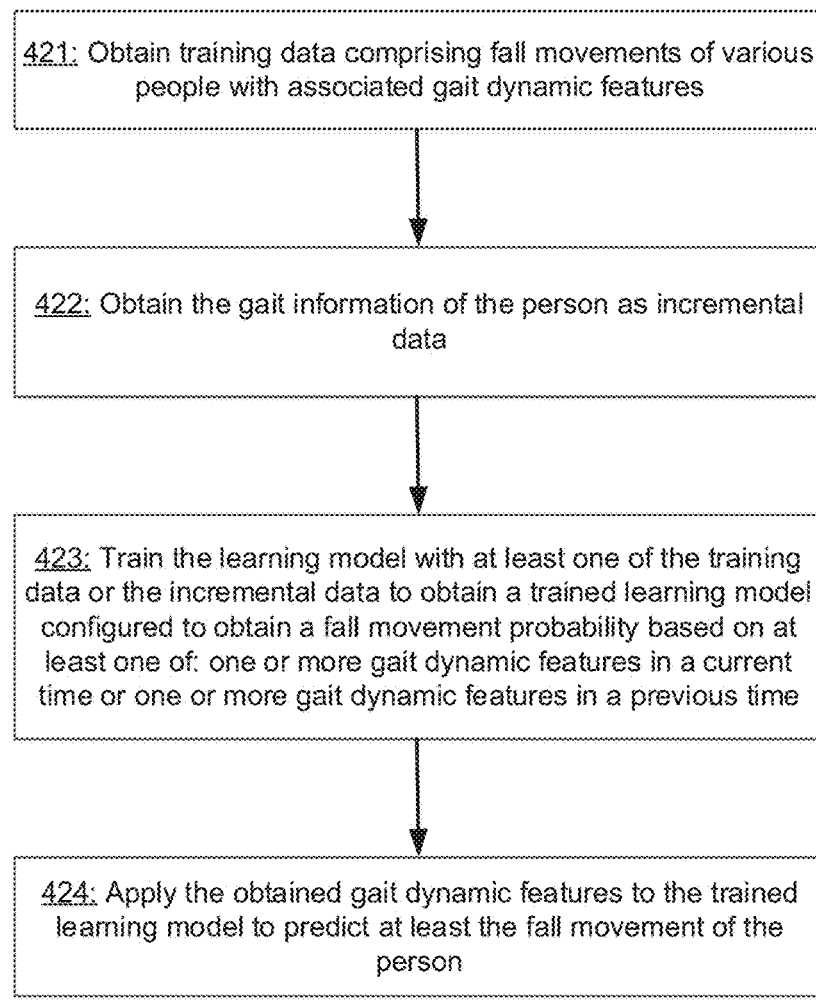

FIGS. 4A-4C illustrate flowcharts 400-420 of an example method for fall prediction, according to various embodiments of the present disclosure. The method for fall prediction may be implemented in various environments including, for example, the environment 100 of FIG. 1. The example method for fall prediction may be implemented by one or more components of the system 102 (e.g., the processor 104, the memory 106). The operations of the method for fall prediction presented below are intended to be illustrative. Depending on the implementation, the example method may include additional, fewer, or alternative steps performed in various orders or in parallel.

At block 402, at least gait information of a person may be obtained. The block 402 may be performed by a processor or may be performed by sensor and the gait information obtained by the sensor may be received by a processor. At block 403, gait dynamic features may be obtained based at least in part on the gait information. At block 404, the obtained gait dynamic features may be applied to a learning model to predict at least a fall movement of the person. At block 405, a device may be controlled to at least mitigate the predicted fall movement. For example, an air-conditioner may be caused to change at least one of its temperature or humidity control setting to effectuate a temperature and/or moisture control of an environment of the person, which can at least mitigate the predicted fall movement. At block 406, a notification may be triggered. For example, the notification may be an alert (e.g., a text, a voice, an image, etc.) pushed to a computing device (e.g., a mobile phone of a relative of the person) and/or played directly (e.g., through an home appliance in an environment of the person). The block 404 may comprise the flowchart 410 described below with reference to FIG. 4B and/or the flowchart 420 described below with reference to FIG. 4C.

FIG. 4B describes an example application of the person's data and information to a trained learning model. In the flowchart 410 of FIG. 4B, at block 411, an environment condition may be obtained, and the environment condition comprise at least one of a temperature or a humidity of an environment (e.g., house) of the person. At block 412, a health condition (e.g., a pre-existing condition) of the person may be obtained. At block 413, the obtained gait dynamic features, the obtained health condition, and the obtained environment condition may be applied to the learning model to predict at least the fall movement of the person.

FIG. 4C describes an example training of the learning model. In the flowchart 420 of FIG. 4C, at block 421, training data comprising fall movements of various people with associated gait dynamic features may be obtained. In some embodiments, the training data may also comprise the environment conditions and the health conditions of the various people associated with the gait dynamic features. At block 422, optionally, the gait information of the person (described in FIG. 4A) may be obtained as incremental data. At block 423, the learning model may be trained with at least one of the training data or the incremental data to obtain a trained learning model. The trained learning model may be configured to obtain a fall movement probability based on at least one of: one or more gait dynamic features in a current time or one or more gait dynamic features in a previous time. The learning model is described above with reference to FIG. 3C. At block 424, the obtained gait dynamic features may be applied to the trained learning model to predict at least the fall movement of the person.

The techniques described herein can be implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
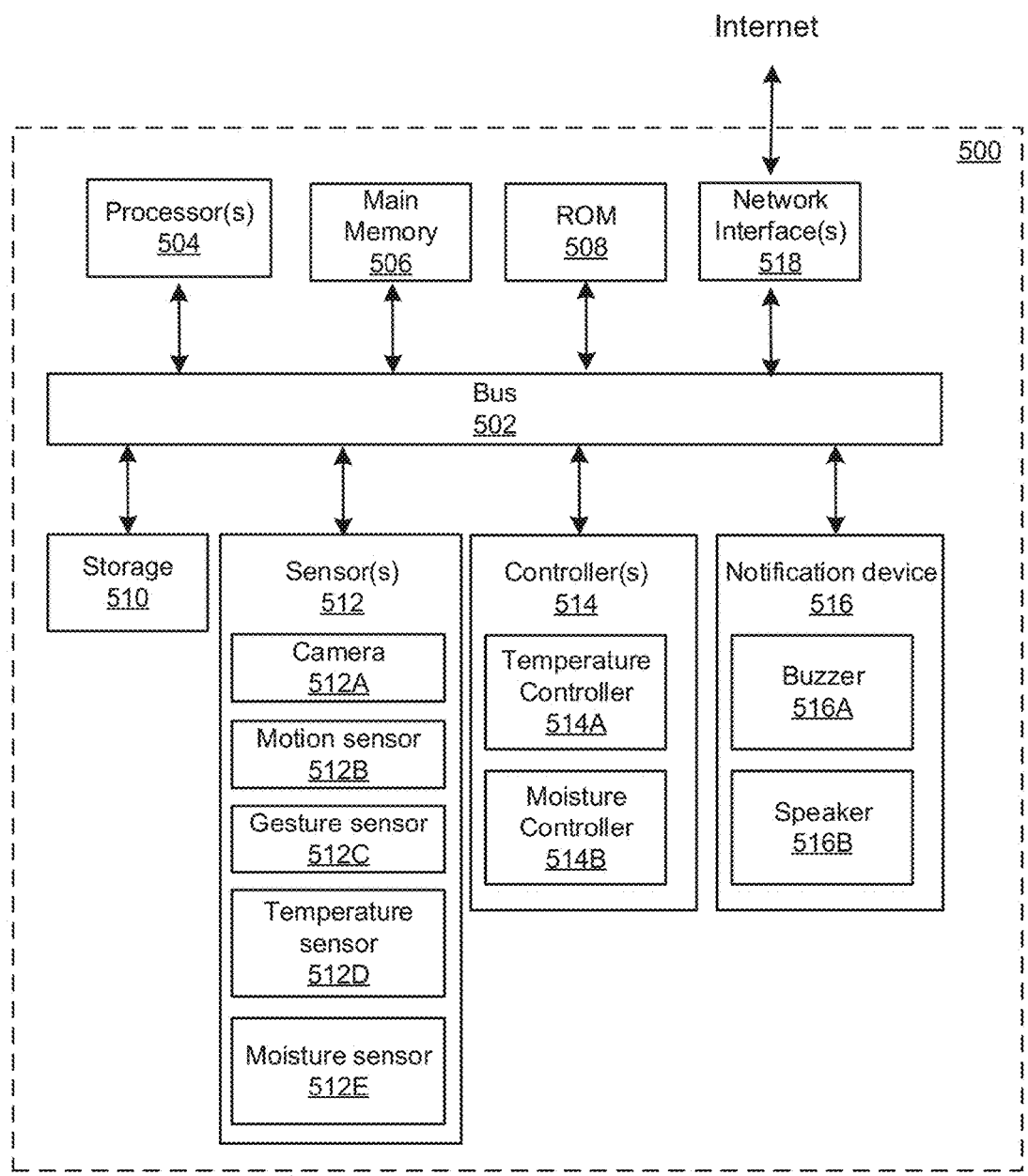
FIG. 5 illustrates a block diagram of an example computer system in which any of the embodiments described herein may be implemented.

FIG. 5 is a block diagram that illustrates a system 500 upon which any of the embodiments described herein may be implemented. The system 500 presented below are intended to be illustrative. Depending on the implementation, the example system 500 or components thereof may include additional, fewer, or alternative components or sub-components. The system 500 may be implemented as various devices (e.g., home appliances), such as a computer, an air-conditioner, a vent, a refrigerator, a humidifier, a vacuum cleaner, etc.

The system 500 may correspond to the environment 100 described above. The system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render the system 500 into a special-purpose machine that is customized to perform the operations specified in the instructions.

The system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The system 500 may implement the techniques described herein using customized hard-wired logic, one or more ASICs or FPGAs, firmware and/or program logic which in combination with the system causes or programs system 500 to be a special-purpose machine. According to one embodiment, the techniques herein are performed by system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Optionally, the system 500 may include one or more sensors 512, such as camera 512A, motion sensor 512B, gesture sensor 512C, temperature sensor 512D, moisture sensor 512E, etc. The sensor 512 may correspond to the sensor 103 described above. The sensor 512 may comprise an optical sensor configured to capture optical data of people and environment in its field of view.

Optionally, the system 500 may include one or more controllers 514, such as temperature controller 514A, moisture controller 514B, etc. The controller 514 may correspond to controller 107 described above. In some embodiment, in which the system 500 are implemented in an appliance, the controller 514 may be configured to control one or more appliance components to effectuate various changes. For example, the controller 514 may control an air compressor and decompressor to effectuate temperature change, or control an fan to effectuate humidity change.

Optionally, the system 500 may include one or more notification devices 516, such as buzzer 516A, speaker 516B, etc. The notification device 516 may correspond to notification device 105 described above. The notification device 516 may be configured to notify a detected or predicted fall.

The system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The system 500 can send and receive data, including program code, through the network(s), network link and communication interface 518. In the Internet example, the system 500 may transmit data to a server for data processing and receive processed data or instructions from the server through the Internet, the ISP, the local network and the communication interface 518. The received data or instructions may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more systems or processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A system for fall prediction, comprising:
one or more sensors configured to obtain at least gait information of a person;
one or more processors coupled to the one or more sensors and configured to:
receive the gait information of the person;
obtain gait dynamic features based at least in part on the obtained gait information;
apply the obtained gait dynamic features to a learning model to predict at least a fall movement of the person, including
obtaining a humidity condition of an environment of the person;
obtaining a health condition of the person; and
applying the obtained gait dynamic features, the obtained health condition, and the obtained humidity condition to the learning model to predict at least the fall movement of the person; and change a humidity control setting of an air-conditioner in the environment of the person to mitigate the predicted fall movement.

2. The system of claim 1, wherein:
to apply the obtained gait dynamic features to the learning model to predict at least the fall movement of the person, the one or more processors are configured to:
   obtain an environment condition, the environment condition comprising at least a temperature of an environment of the person; and
   apply the obtained gait dynamic features, the obtained health condition, and the obtained environment condition to the learning model to predict at least the fall movement of the person.

3. The system of claim 1, wherein:
the one or more sensors comprise one or more optical sensors; and
the optical sensors comprise at least one of a camera, an infrared sensor, a motion sensor, a temperature sensor, or a gesture sensor.

4. The system of claim 1, wherein:
the one or more sensors and the one or more processors are disposed in a household appliance.

5. The system of claim 1, wherein:
the one or more processors are coupled to the one or more sensors through a network.

6. The system of claim 1, wherein:
the gait dynamic features include at least one of cadence, left step length, right step length, base of support left step, base of support right step, left stride length, or right stride length.

7. The system of claim 1, wherein:
the learning model comprises a Dynamic Bayesian Network (DBN) model;
to apply the obtained gait dynamic features to the learning model to predict at least the fall movement of the person, the one or more processors are configured to:
   obtain training data comprising fall movements of various people with associated gait dynamic features;
   obtain the gait information of the person as incremental data;
   train the learning model with at least one of the training data or the incremental data to obtain a trained learning model configured to obtain a fall movement probability based on at least one of: one or more gait dynamic features in a current time or one or more gait dynamic features in a previous time; and
   apply the obtained gait dynamic features to the trained learning model to predict at least the fall movement of the person.

8. The system of claim 1, wherein:
the prediction of the fall movement comprises a probability of the fall during a current or future time period.

9. The system of claim 1, wherein:
the one or more processors are further configured to change a temperature control setting of air-conditioner to mitigate the predicted fall movement.

10. The system of claim 1, wherein:
the one or more processors are further configured to trigger a notification of the prediction.

11. A method for fall prediction, comprising:
obtaining at least gait information of a person;
obtaining gait dynamic features based at least in part on the gait information; and
applying the obtained gait dynamic features to a learning model to predict at least a fall movement of the person, including
   obtaining a humidity condition of an environment of the person;
   obtaining a health condition of the person; and
   applying the obtained gait dynamic features, the obtained health condition, and the obtained humidity condition to the learning model to predict at least the fall movement of the person; and
changing a humidity control setting of an air-conditioner in the environment of the person to mitigate the predicted fall movement.

12. The method of claim 11, wherein:
applying the obtained gait dynamic features to the learning model to predict at least the fall movement of the person comprises:
   obtaining an environment condition comprising at least one of a temperature or a humidity of an environment of the person;
   obtaining a health condition of the person; and
   applying the obtained gait dynamic features, the obtained health condition, and the obtained environment condition to the learning model to predict at least the fall movement of the person.

13. The method of claim 11, wherein:
the gait dynamic features include at least one of cadence, left step length, right step length, base of support left step, base of support right step, left stride length, or right stride length.

14. The method of claim 11, wherein:
the learning model comprises a Dynamic Bayesian Network (DBN) model; and
applying the obtained gait dynamic features to the learning model to predict at least the fall movement of the person comprises:
   obtaining training data comprising fall movements of various people with associated gait dynamic features;
   obtaining the gait information of the person as incremental data;
   training the learning model with at least one of the training data or the incremental data to obtain a trained learning model configured to obtain a fall movement probability based on at least one of: one or more gait dynamic features in a current time or one or more gait dynamic features in a previous time; and
   applying the obtained gait dynamic features to the trained learning model to predict at least the fall movement of the person.

15. The method of claim 11, further comprising:
changing a temperature control setting of the air-conditioner to mitigate the predicted fall movement.

16. A non-transitory computer-readable medium for fall prediction, comprising instructions stored therein, wherein the instructions, when executed by one or more processors, perform the steps of:
obtaining at least gait information of a person;
obtaining gait dynamic features based at least in part on the gait information; and
applying the obtained gait dynamic features to a learning model to predict at least a fall movement of the person, including
   obtaining a humidity condition of an environment of the person;
   obtaining a health condition of the person; and applying the obtained gait dynamic features, the obtained health condition, and the obtained humidity condition to the learning model to predict at least the fall movement of the person; and change a humidity control setting of an air-conditioner in the environment of the person to mitigate the predicted fall movement.

17. The medium of claim 16, wherein:

applying the obtained gait dynamic features to the learning model to predict at least the fall movement of the person comprises:
- obtaining an environment condition comprising at least one of a temperature or a humidity of an environment of the person;
- obtaining a health condition of the person; and
- applying the obtained gait dynamic features, the obtained health condition, and the obtained environment condition to the learning model to predict at least the fall movement of the person.

18. The medium of claim 16, wherein:

the gait dynamic features include at least one of cadence, left step length, right step length, base of support left step, base of support right step, left stride length, or right stride length.

19. The medium of claim 16, wherein:

the learning model comprises a Dynamic Bayesian Network (DBN) model; and applying the obtained gait dynamic features to the trained learning model to predict at least the fall movement of the person comprises:
- obtaining training data comprising fall movements of various people with associated gait dynamic features;
- obtaining the gait information of the person as incremental data;
- training the learning model with at least one of the training data or the incremental data to obtain a trained learning model configured to obtain a fall movement probability based on at least one of: one or more gait dynamic features in a current time or one or more gait dynamic features in a previous time; and
- applying the obtained gait dynamic features to the trained learning model to predict at least a fall movement of the person.

20. The medium of claim 16, wherein the instructions, when executed by one or more processors, further perform the step of:
changing a temperature control setting of the air-conditioner to mitigate the predicted fall movement.

* * * * *